US012182770B2

(12) United States Patent
Rodriguez et al.

(10) Patent No.: US 12,182,770 B2
(45) Date of Patent: Dec. 31, 2024

(54) CUSTOMIZABLE EVENT MANAGEMENT IN COMPUTING SYSTEMS

(71) Applicant: Microsoft Technology Licensing, LLC, Redmond, WA (US)

(72) Inventors: Victoria Carolina Rodriguez, Lynnwood, WA (US); Tariq Sharif, Sammamish, WA (US); Chiquita Kerur, Kirkland, WA (US); Sindhura Gangireddy, Redmond, WA (US); Ankit Gupta, Issaquah, WA (US); Charlie Ricafort Chung, Tacoma, WA (US); Alexis Jacqueline Benter, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/383,231

(22) Filed: Jul. 22, 2021

(65) Prior Publication Data
US 2023/0034999 A1 Feb. 2, 2023

(51) Int. Cl.
  G06Q 10/00 (2023.01)
  G06F 11/34 (2006.01)
  G06Q 10/0633 (2023.01)
  G06Q 10/107 (2023.01)
  G06Q 10/1093 (2023.01)

(52) U.S. Cl.
  CPC ..... *G06Q 10/1097* (2013.01); *G06F 11/3409* (2013.01); *G06Q 10/0633* (2013.01); *G06Q 10/107* (2013.01)

(58) Field of Classification Search
  CPC .......... G06Q 10/107; G06Q 10/1097
  See application file for complete search history.

(56) References Cited

U.S. PATENT DOCUMENTS

| 7,302,643 B1 * | 11/2007 | Edlund ........... G06Q 10/06314 715/963 |
| 10,367,649 B2 | 7/2019 | Donneau-golencer et al. |
| 10,891,571 B2 | 1/2021 | Relangi |

(Continued)

FOREIGN PATENT DOCUMENTS

WO  02065240 A2  8/2002

OTHER PUBLICATIONS

Berry, et al., "PTIME: Personalized Assistance for Calendaring", In Journal of ACM Transactions on Intelligent Systems and Technology, vol. 2, Issue 4, Jul. 2011, 22 Pages.
(Continued)

*Primary Examiner* — Matheus Ribeiro Stivaletti (57) ABSTRACT

Event workflow management in computing systems are disclosed herein. In one example, a process includes receiving a data package defining an event containing data representing a category corresponding to a type of activity of the event and having a workflow property. The process can then include creating or modifying a backend workflow of the event corresponding to the workflow property of the category and monitoring for the one or more status conditions of the event included in the backend workflow. When the monitoring indicates that the one or more status conditions of the event are satisfied, the one or more actions in the sequence of the backend workflow are executed in relation to the event.

20 Claims, 9 Drawing Sheets

(56) References Cited

U.S. PATENT DOCUMENTS

| | | | |
|---|---|---|---|
| 2006/0277544 A1* | 12/2006 | Bjoernsen | G06Q 10/10 |
| | | | 718/100 |
| 2014/0229560 A1* | 8/2014 | Gray | H04L 51/046 |
| | | | 709/206 |
| 2015/0193819 A1* | 7/2015 | Chang | G06Q 30/0252 |
| | | | 705/7.19 |
| 2016/0073172 A1* | 3/2016 | Sharples | H04N 21/858 |
| | | | 725/80 |
| 2018/0275846 A1* | 9/2018 | Perret | G06Q 10/1093 |
| 2019/0014450 A1* | 1/2019 | Gruber | G06F 16/243 |
| 2019/0180248 A1 | 6/2019 | Byun et al. | |
| 2019/0287073 A1 | 9/2019 | Singh et al. | |
| 2020/0258029 A1 | 8/2020 | Jung et al. | |
| 2020/0311579 A1 | 10/2020 | Dial | |
| 2020/0402019 A1 | 12/2020 | Truong et al. | |
| 2021/0342785 A1* | 11/2021 | Mann | G06Q 10/06313 |
| 2022/0222625 A1* | 7/2022 | Haramati | G06F 3/04847 |

OTHER PUBLICATIONS

Kim, et al., "Learning User Preferences and Understanding Calendar Contexts for Event Scheduling", In Proceedings of the 27th ACM International Conference on Information and Knowledge Management, Oct. 22, 2018, pp. 337-346.

"International Search Report and Written Opinion Issued in PCT Application No. PCT/US22/031702", Mailed Date: Aug. 17, 2022, 9 Pages.

* cited by examiner

CUSTOMIZABLE EVENT MANAGEMENT IN COMPUTING SYSTEMS

BACKGROUND

Certain computing systems can be configured to provide event management capability to users. For example, an electronic calendar system can be configured to create, store, and track events and tasks for users. During operation, upon receiving an input from a user to create an event, the electronic calendar system can be configured to create and save in a database a data structure containing various parameters of the event, such as a start date/time, an end date/time, etc. Subsequently, upon detecting that the start date/time is reached, the electronic calendar system can be configured to provide notifications, reminders, or other suitable output to the user.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In certain electronic calendar systems, backend servers that are configured to manage creation and storage of data structures for events may not have access to certain parameters of the events due to privacy, security, legal, or other constraints. For instance, backend servers may not be permitted to access event variables such as descriptions, locations, or event participant(s) due to legal requirements in regions such as the European Union. As such, the backend servers may not perceive an event stored as a data structure as a block of reserved time on a user's calendar. The lack of access to such parameters renders the electronic calendar system incapable of providing users with certain event management functionalities, such as automatic responses, presence modification, automatic confirmation, etc.

Several embodiments of the disclosed technology can address at least some aspects of the foregoing difficulties by schematizing various events in an electronic calendar system. In certain implementations, different events can be categorized based on activity types and include corresponding schemas having a collection of logical structures of data. For instance, example categories can include "lunch," "exercise," "focus time," "doctor's appointment," "travel time," "time away," etc. In other implementations, different events can also be categorized based on event durations, personal/work relatedness, or other suitable criteria. In further implementations, the electronic calendar system can be configured to allow user-defined categories.

Schemas of various event categories can define certain "behaviors" or actions stored as properties of events in corresponding data structures. For example, a "focus time" event can have properties that define a presence status (e.g., "Focusing") for the event, an automatic notification of "Do-not-disturb" to other users during the event, and a workflow that automatically opens a to-do list in a word processor when the start date/time is reached. In another example, a "doctor's appointment" can have properties that define an automatic decline of all existing and/or new invitations for meetings.

In yet further examples, certain categories of events can have properties that indicate such events can be moved to other available dates/times. For instance, an "exercise" event may be defined as flexible. As such, another event (e.g., "lunch") may be scheduled over the "exercise" event, which can be automatically moved to a next available slot. In certain embodiments, at least some of the behaviors of categories of events can be defined by default. In other embodiments, one or more behaviors of categories of events can also be customized by users, as described in more detail below.

In accordance with embodiments of the disclosed technology, the electronic calendar system can be configured to provide a graphical user interface to a user for selecting and/or defining various categories and properties of events according to corresponding schemas. In one embodiment, upon receiving an input to create a new event, a standalone or web-based client application can be configured to output on a client device a graphical user interface with data fields configured to receive input of a start date/time, an end date/time, and other suitable parameters of the event. The graphical user interface can also include a dropdown list that is configured to allow the user to select a category and define properties for the event. In other embodiments, the graphical user interface can have other suitable data fields, interface elements, and/or arrangements suitable for receiving the foregoing input and selections from the user.

Upon receiving a user selection of one of the categories for the event, the electronic calendar system can be configured to output additional data fields configured to receive input of various properties that define "behaviors" of the event. In certain implementations, certain default properties may be output for selection by the user. Examples default properties can include those defining presence status, presence tips, etc. In other implementations, the additional data fields can also be configured to allow the user to create customized workflow related to the event. For example, when creating a "lunch" event, the graphical user interface can be configured to allow the user to create an automatic confirmation workflow for the scheduled event. Based on the confirmation workflow, the electronic calendar system can be configured to automatically generate and transmit emails (or other suitable types of electronic messages) to other participants of the "lunch" event a duration before the start date/time. If no response to the confirmation email is received from one or more of the participants, the electronic calendar system can be configured to automatically cancel the "lunch" event, reschedule the "lunch" event, or perform other suitable actions. Otherwise, the electronic calendar system can show the "lunch" event is confirmed.

Upon receiving an indication from the user that input for the event is complete, the client application can be configured to create a data package having structured or unstructured data representing the various parameters, categories, and properties of the event received from the user. The client application can then transmit the data package to a calendar service hosted at backend servers of the electronic calendar system for processing and storage. Upon receiving the data package, the calendar service at the backend servers can be configured to verify integrity of the data package, authenticate user credentials, or perform other suitable access control operations. Upon verification, the backend servers can be configured to parse the data package for the various parameters, categories, and properties, and store parsed data in a data structure for the event.

In accordance with embodiments of the disclosed technology, the backend servers can also be configured to host a workflow manager that is configured to monitor created events for categories and properties, and in response, generate, modify, delete, or otherwise control workflow related to the created events based on a category and one or more properties of the category. For instance, in the "lunch" example above, upon detecting that the event includes a category (e.g., "lunch"), the workflow manager further determines one or more properties that may impact workflow for the event. As such, based on the property that defines an automatic confirmation for the event, the workflow manager can be configured to generate a new workflow (e.g., "automatic confirmation") including definitions of actions, action parameters, and/or other suitable information.

The new workflow can then be stored in a workflow database and be executed by a worker process at the electronic calendar system. For instance, upon determining that a duration prior to a start date/time is reached, the worker process can be configured to generate suitable calls to an Application Programming Interfaces (API) of an email service to generate and transmit confirmation emails to other participants of the "lunch" event. The worker process can also be configured to monitor responses to the sent confirmation emails from the other participants. When participants' responses to the confirmation emails are positive, the worker process can be configured to modify the "lunch" event with an indicator that the event has been confirmed, transmitting another email to the user indicating the "lunch" event is confirmed, or perform other suitable actions. On the other hand, when one or more participants responds negatively or do not respond within a threshold duration, the worker process can be configured to automatically cancel and/or reschedule the event, transmitting a cancelation email to all the participants, etc.

As such, by allowing users to select categories of events that have one or more properties of such categories defining corresponding behaviors, the electronic calendar system can provide additional event management capabilities to users by creating or modifying workflows without compromising privacy/security or violating legal requirements in various regions. Without divulging any details of an event, a user can define certain actions be performed by the backend servers via executing suitable workflows. As such, the backend servers can be operated efficiently to provide good user experience.

DETAILED DESCRIPTION

Certain embodiments of systems, devices, components, modules, routines, data structures, and processes for implementing event workflow management in computing systems are described below. In the following description, specific details of components are included to provide a thorough understanding of certain embodiments of the disclosed technology. A person skilled in the relevant art will also understand that the technology can have additional embodiments. The technology can also be practiced without several of the details of the embodiments described below with reference to FIGS. 1-5.

In certain electronic calendar systems, backend servers may not have access to certain parameters of events due to privacy, security, legal, or other constraints. The lack of access to such parameters renders the electronic calendar system incapable of providing users with certain event management functionalities, such as automatic responses, presence modification, automatic confirmation, etc. Several embodiments of the disclosed technology can address at least some aspects of the foregoing difficulties by schematizing various events in an electronic calendar system. Different events can be categorized based on activity types. Each category of events can be associated with a data structure according to a schema that defines actions or behaviors associated with events of such category. As such, during operation, backend servers can be configured to parse data packages of events and identify a selected category. Based on the category, the backend servers can create or modify one or more workflows to be executed to provide corresponding event management functionalities, as described in more detail below with reference to FIGS. 1-5.

Figure 1:
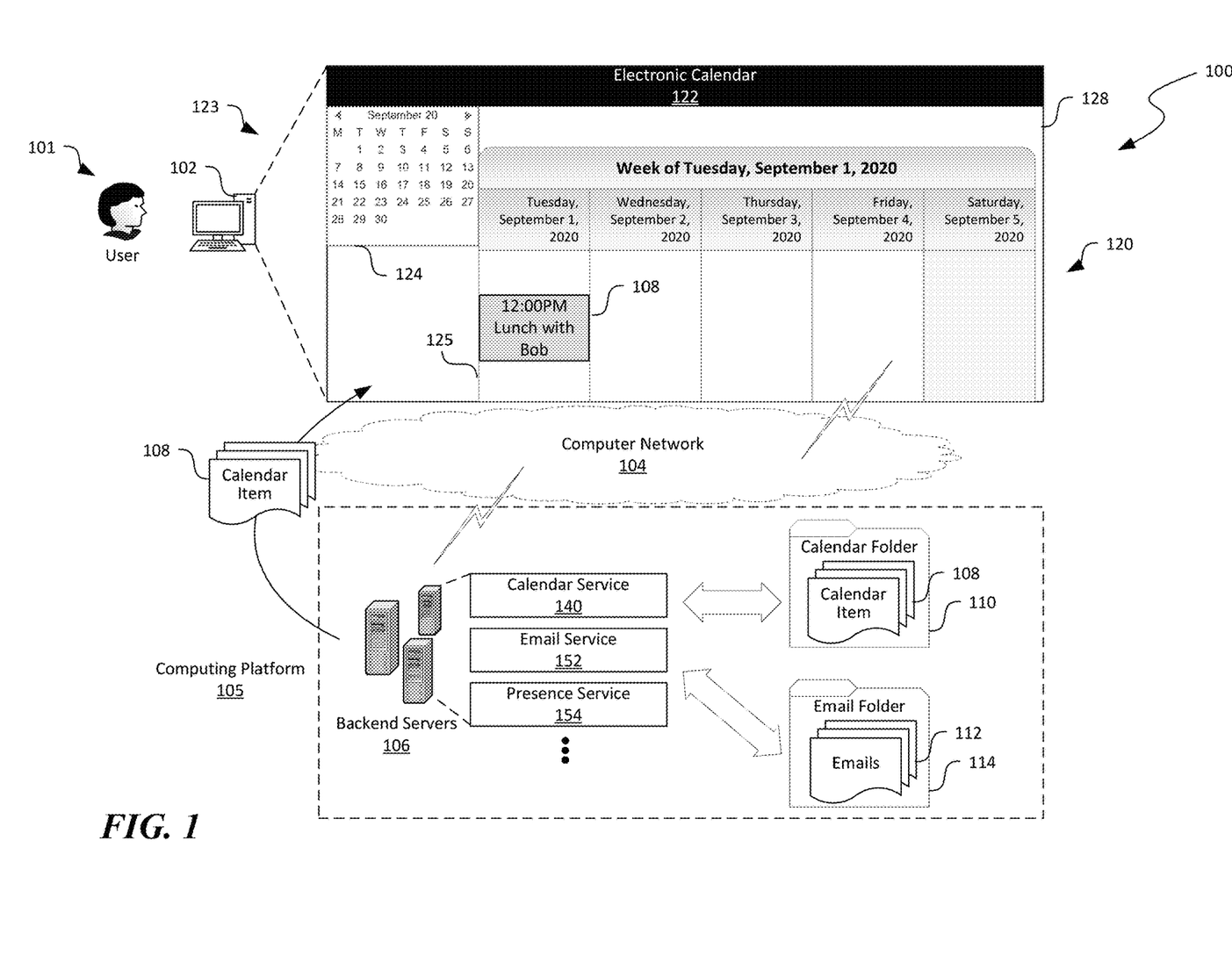
FIG. 1 is a schematic block diagrams illustrating an example computing system implementing event workflow management in accordance with embodiments of the present technology.

FIG. 1 is a schematic block diagrams of an example computing system 100 implementing event workflow management in accordance with embodiments of the present technology. In FIG. 1 and in other Figures herein, individual software components, objects, classes, modules, and routines may be a computer program, procedure, or process written as source code in C, C++, C#, Java, and/or other suitable programming languages. A component may include, without limitation, one or more modules, objects, classes, routines, properties, processes, threads, executables, libraries, or other components. Components may be in source or binary form. Components may also include aspects of source code before compilation (e.g., classes, properties, procedures, routines), compiled binary units (e.g., libraries, executables), or artifacts instantiated and used at runtime (e.g., objects, processes, threads).

Components within a system may take different forms within the system. As one example, a system comprising a first component, a second component, and a third component. The foregoing components can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a tablet computer, a network server, a laptop computer, a smartphone, and/or other suitable computing devices.

Equally, components may include hardware circuitry. In certain examples, hardware may be considered fossilized software, and software may be considered liquefied hardware. As just one example, software instructions in a component may be burned to a Programmable Logic Array circuit or may be designed as a hardware component with appropriate integrated circuits. Equally, hardware may be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media. As used herein, the term "computer readable storage media" excludes propagated signals.

As shown in FIG. 1, the computing system 100 can include a computer network 104 interconnecting a client device 102 of a user 101 with a computing platform 105 having one or more backend servers 106. The computer network 104 can include an intranet, a wide area network, the Internet, or other suitable types of networks. Even though particular components of the computing system 100 are shown in FIG. 1, in other embodiments, the computing system 100 can also include additional and/or different components or arrangements. For example, the computing platform 105 can also be interconnected to one or more additional client device 102 (not shown). In further examples, the computing system 100 can also include additional network storage devices, additional servers, and/or other suitable components (not shown).

As shown in FIG. 1, the backend servers 106 of the computing platform 105 can be configured to execute suitable instructions to provide various computing services to the client device 102 or the user 101 via the computer network 104. For example, as shown in FIG. 1, the backend servers 106 can be configured to provide a calendar service 140, an email server, 152, and a present service 154. In other examples, the backend servers 106 can also be configured to provide a cloud storage service, a cloud computing service, a file management service, a weather forecast service, or other suitable types of computing services.

The calendar service 140 can be configured to manage an electronic calendar 122 of the user 101 stored in a calendar folder 110. As shown in FIG. 1, the calendar folder 110 can include one or more calendar items 108 individually having data representing an appointment, event, task, or other suitable types of objects with corresponding date/time, location, or other suitable information in a suitable data structure. The email service 152 can be configured to provide various functionalities for creating, transmitting, forwarding, deleting, or otherwise manage electronic mails or emails 112 of the user 101 stored in an email folder 114. The presence service 154 can be configured to manage and output data representing a presence status of the user 101. For example, the presence status may indicate that the user 101 is in a meeting, at a doctor's appointment, or engaged in other suitable types of activities. The presence service 154 can be configured to output, via the calendar service 140 and the email service 152, the presence status of the user 101 in the electronic calendar 122, email clients (not shown), or other suitable destinations of the user 101 and/or other users (not shown).

The client device 102 can include a computing device that is configured to facilitate accessing computing services and/or digital data provided by the computing platform 105 via the computer network 104. For example, in the illustrated embodiment, the client device 102 includes a desktop computer configured to execute suitable instructions of a computer application 122 to provide the electronic calendar 142. In other embodiments, the client devices 102 can also include laptop computers, tablet computers, smartphones, or other suitable computing devices configured to provide a web browser, an email client, a calendar client, a contact list client, or other suitable computing services.

FIG. 1 also shows an example graphical user interface 123 of the electronic calendar 122 by executing the client application 120 at the client device 102. As shown in FIG. 1, the graphical user interface 123 can include a monthly view 124 and a weekly view 125 of the electronic calendar 122 of the user 101. In the illustrated example, a calendar item 108 (e.g., an event) is shown as a block having an annotation (e.g., "12:00 PM Lunch with Bob") placed in a corresponding column and row of a grid-like weekly view 125. During operation, the backend servers 106 can be configured to retrieve various calendar items 108 from the calendar folder 110 of the user 101, transmit the calendar items 108 to the client device 102 via the computer network 104 to be displayed in the electronic calendar 122.

Though the calendar item 108 (e.g., "Lunch with Bob") is shown in the electronic calendar 122 to the user 101 with all details, such as an activity (e.g., "Lunch"), a participant (e.g., "Bob"), etc., the backend servers 106 may not have access to the foregoing information due to privacy, security, legal, or other constraints. As such, the various computing services at the backend servers 106 may be incapable of providing users with certain event management functionalities based on such information, such as automatic responses, presence modification, automatic confirmation, etc.

Several embodiments of the disclosed technology can address at least some aspects of the foregoing difficulties by schematizing the calendar items 108 according to activity types. In certain implementations, different calendar items 108 can be categorized based on activity types and include corresponding schemas having a collection of logical structures of data. For instance, example categories can include "lunch," "exercise," "focus time," "doctor's appointment," "travel time," time away," etc. In other implementations, different calendar items 108 can also be categorized based on event durations, personal/work relatedness, or other suitable criteria. In further implementations, the electronic calendar 122 can be configured to allow user-defined categories.

In one implementation, a category of an event can be represented by a first-class property having a property name of, e.g., "Event_Classification" with a property values of, e.g., "lunch," "exercise," "focus_time," "doctor_appointment," "travel_time," time_away," etc. For instance, in the example shown in FIG. 1, the calendar item 108 representing "Lunch with Bob" can have the following property and property value:

"Event_Classification": ["Lunch"]

In other implementations, a category of an event can also be represented by an attribute, a class, or other suitable data containers.

Schemas of various categories can define certain "behaviors" or actions stored as properties of calendar items 108 in corresponding data structures. For example, a "focus time" event can have properties with a property value that defines a presence status (e.g., "Focusing") for the event, an automatic notification of "Do-not-disturb" to other users during the event, and a workflow that automatically opens a to-do list in a word processor when the start date/time is reached. In another example, a "doctor's appointment" can have properties that define an automatic decline of all existing and/or new invitations for meetings. In one implementation, behaviors of a category can be represented as key-value maps. For instance, the following example key-value map can represent the behavior of "lunch" category of events:

"Lunch": ["DoNotDisturb", "DeclineNewMeetings"]

In the example above, events of "Lunch" category are associated with behaviors of do-not-disturb (e.g., silencing all notifications) and decline new meeting (e.g., automatically decline all new meeting invitations for the same date/time). In other implementations, behaviors of a category can also be represented as a table entry in a database or in other suitable ways.

In further examples, certain categories of calendar items can have properties having a property value (e.g., a Boolean value) that indicate such calendar items 108 can be flexible (i.e., movable to other available dates/times) or fixed (i.e., not movable) by adding a value of "Flexible" to the above example key-value map. For instance, an "exercise" event may be defined as flexible. As such, another event (e.g., "lunch") may be scheduled over the "exercise" event, which can be automatically moved to a next available slot. In certain embodiments, at least some of the behaviors of categories of calendar items can be defined by default. In other embodiments, one or more behaviors of categories of calendar items can also be customized by users, as described in more detail herein.

In certain embodiments, each event of a category can have a corresponding set of custom enabled behaviors selected by the user 101 when the category is associated with multiple selectable behaviors. In one implementation, such selection can be stored as an extended property of the event as follows:

```
{
  "Extended Property":[
  {
    "PropertyID": "Boolean Name DeclineNewMeetings",
    "Value": "true"
  },
  {
    "PropertyID": "Boolean Name DoNotDisturb",
    "Value": "false"
  },]
}
```

In the example above, the behavior "DeclineNewMeetings" is selected to be true while the other behavior "DoNotDisturb" is selected to be false. In other implementations, such selections can also be represented using state machines, table entries, or other suitable data structures.

Figure 2A:
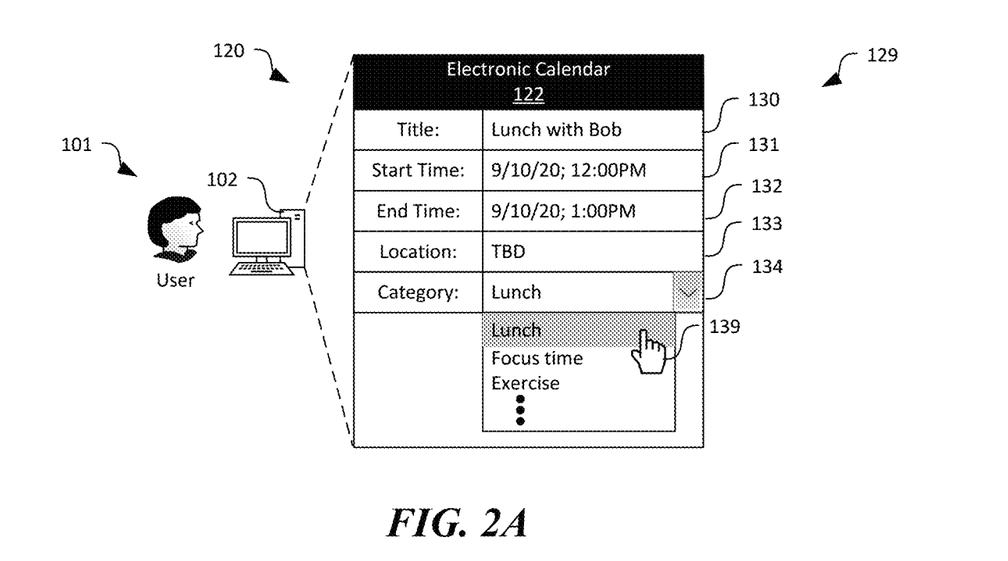
FIGS. 2A and 2B are schematic block diagrams illustrating example graphical user interfaces for selecting/defining categories and/or corresponding properties of events in accordance with embodiments of the present technology.

As shown in FIG. 2A, in accordance with embodiments of the disclosed technology, the client application 120 can be configured to provide a graphical user interface 129 to the user 101 for selecting and/or defining various categories and associated properties of calendar items 108 such as events according to corresponding schemas in the electronic calendar 122. In one embodiment, upon receiving an input to create a new event, the client application 120 can be configured to output on the client device 102 a graphical user interface 129 with data fields configured to receive input. For instance, in the illustrated example, the data fields include a title field 130, a start date/time field 131, an end date/time 132, a location field 133. In other examples, the data fields can also include other suitable data fields for the event. In the illustrated example, the title filed 130 includes data (e.g., a string) representing "Lunch with Bob:" the start time filed 131 includes data (e.g., a numeral) representing "9/10/20; 12:00 PM;" the end time field 132 includes data representing "9/10/20; 1:00 PM;" and the location field includes data (e.g., a string) representing "TBD."

As shown in FIG. 2A, the graphical user interface 129 can also include a dropdown list 134 that is configured to allow the user 101 to select a category and define properties for the event. For instance, as illustrated in FIG. 2A, upon receiving a user input (e.g., a click represented by the cursor 139), the graphical user interface 129 can be configured to show various categories for selection by the user 101. In the illustrated example, options for the category includes "Lunch," "Focus Time," and "Exercise." In other examples, the dropdown list 134 can also include additional and/or different categories for selection by the user 101. In other embodiments, the graphical user interface 129 can have other suitable data fields, interface elements, and/or arrangements suitable for receiving the foregoing input and selections from the user 101.

Figure 2B:
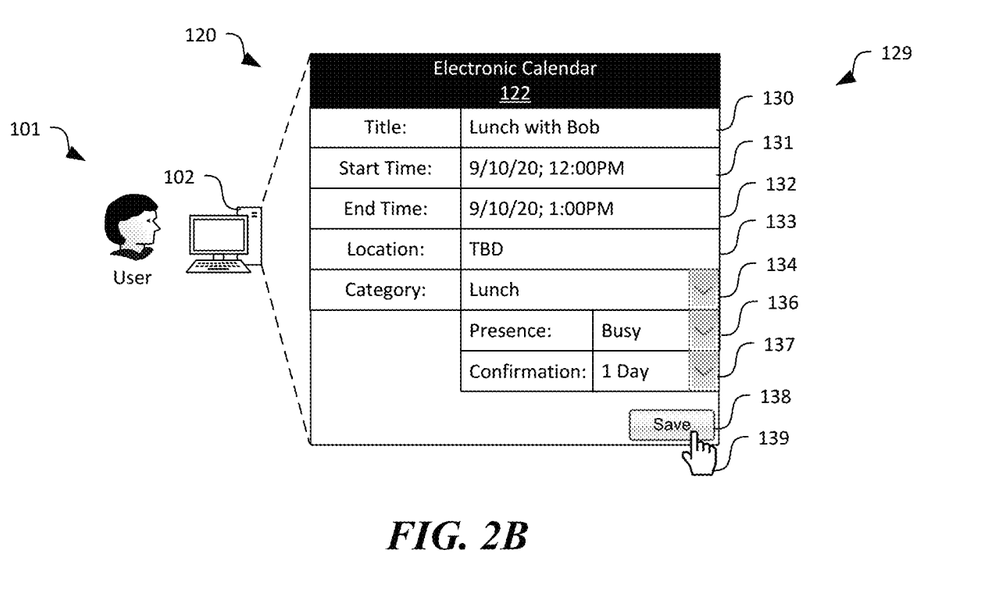

Upon receiving a user selection of one of the categories for the event, e.g., receiving a click on "Lunch" in the dropdown list 134 (represented by the grey highlighting), the client application 120 can be configured to output additional data fields configured to receive input of various properties that define "behaviors" of category of the event, as shown in FIG. 2B. In certain implementations, certain default properties may be output for selection by the user. For instance, in the illustrated example, the user 101 can select a property value (e.g., "Busy") for a default presence behavior using a presence data field 136. In other examples, the user 101 can also select property values for additional and/or different default behaviors using other suitable data fields (not shown).

In other implementations, the additional data fields can also be configured to allow the user 101 to create customized workflow related to the event. For example, when creating the "lunch" event in FIG. 2B, the graphical user interface 129 can be configured to allow the user 101 to launch a workflow editor (not shown), such as that in Dynamic 365 provided by Microsoft Corporation of Redmond, Washington to create an automatic confirmation workflow for the scheduled event. Based on the confirmation workflow, the backend servers 106 (FIG. 1) can be configured to automatically generate and transmit emails 112 (or other suitable types of electronic messages) to other participants of the "lunch" event a duration (e.g., 1 Day shown in FIG. 2B) before the start date/time 131. If no response to the confirmation email is received from one or more of the participants, the backend servers 106 can be configured to automatically cancel the "lunch" event, reschedule the "lunch" event, or perform other suitable actions. Otherwise, the backend servers 106 can show the "lunch" event is confirmed in, for example, the electronic calendar 122.

Upon receiving an indication (e.g., a click on a "Save" button 138) from the user 101 that input for the event is complete, the client application 120 can be configured to create a data package (shown as calendar item 108 in FIG. 3A) having structured or unstructured data representing the various parameters, categories, and properties of the event received from the user 101. The client application 120 can then transmit the data package to the calendar service 140 (shown in FIG. 3A) hosted at the backend servers 106 of the computing platform 105 for processing and storage.

Figure 3A:
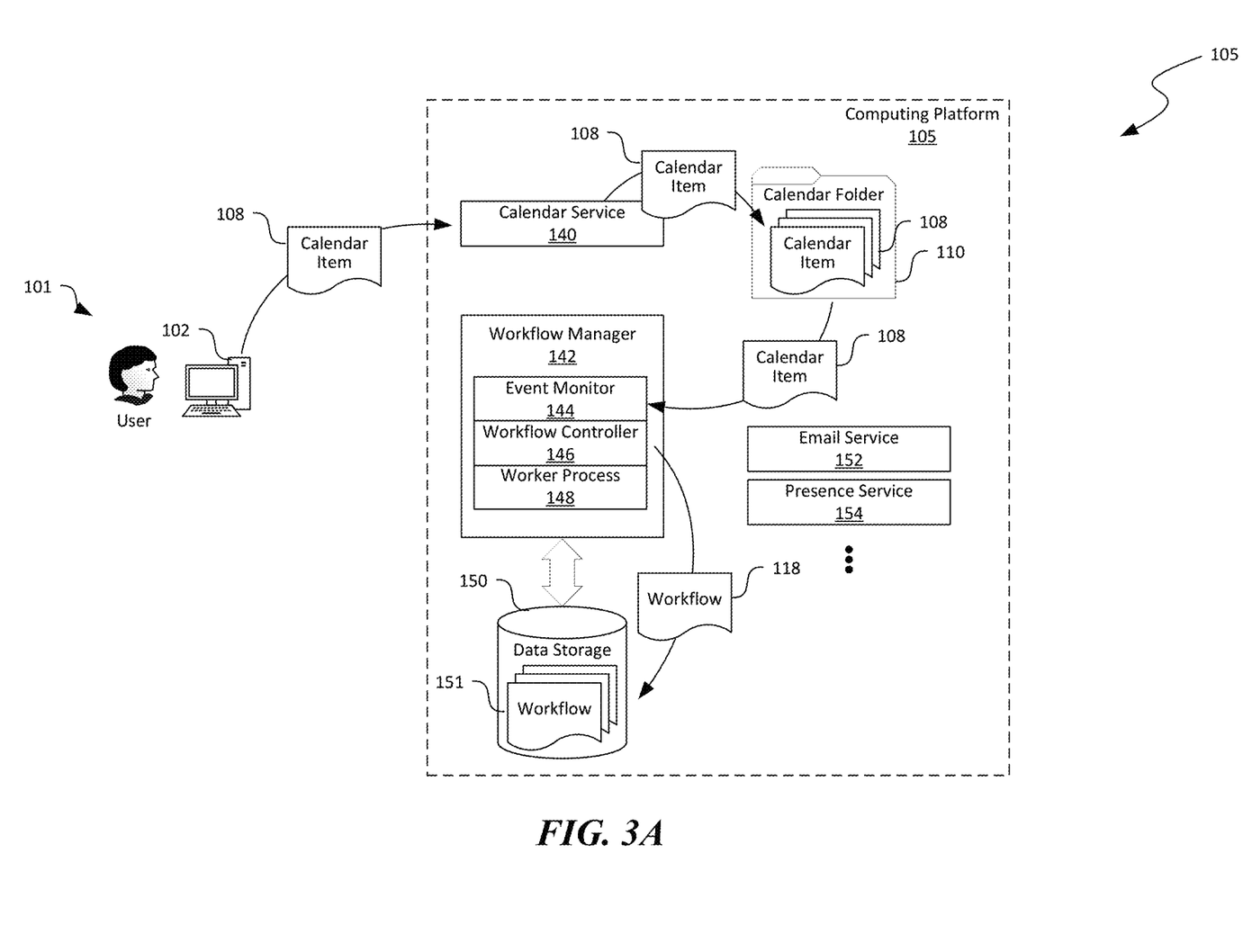
FIGS. 3A-3D are schematic diagrams illustrating example operational stages in the computing system of FIG. 1 in accordance with embodiments of the present technology.
Figure 3B:
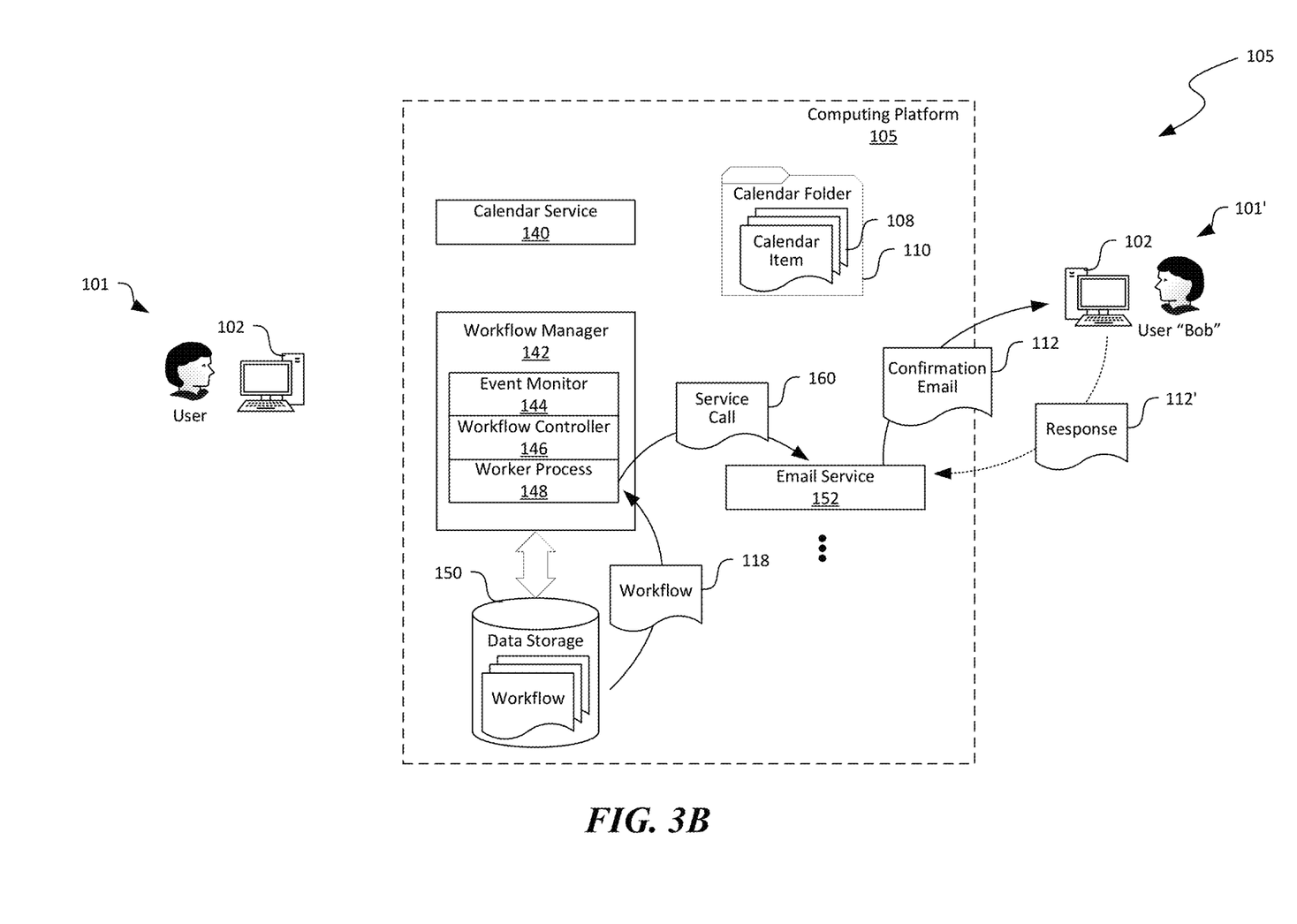

As shown in FIG. 3A, upon receiving the data package representing the calendar item 108 from the client device 102, the calendar service 140 at the backend servers 106 (FIG. 1) can be configured to verify integrity of the data package, authenticate user credentials, or perform other suitable access control operations. Upon verification, the calendar service 140 provided by the backend servers 106 can be configured to parse the data package for the various parameters, categories, and properties, and store parsed data in a data structure for the event in the calendar folder 110 of the user 101.

As shown in FIG. 3A, the backend servers 106 can also be configured to implement a workflow manager 142 that is configured to provide workflow creation, modification, and execution of corresponding to the category and one or more properties of the category related to the calendar item 108. In the description below, an example workflow for automatic confirmation is used to illustrate operations of the various components in the computer system 100. In other examples, the computer system 100 can be configured to perform similar and/or different workflows than that illustrated in FIGS. 3A-3D.

In the illustrated embodiment in FIG. 3A, the workflow manager 142 includes an event monitor 142, a workflow controller 146, and a worker process 148 operatively coupled to one another. In other embodiments, the workflow manager 142 can also include network, database, or other suitable types of components. In further embodiments, one or more of the event monitor 142, workflow controller 146, or worker process 148 may be independent from the workflow manager 142. For instance, in some implementations, the event monitor 142 and/or the worker process 148 can be separate from the workflow manager 142. Instead, the even monitor 142 and/or the worker process 148 can be operatively coupled to the workflow manager 142 to perform suitable workflow operations described below.

The event monitor 144 can be configured to determine whether data package representing the new calendar item 108 includes data indicating a category and one or more associated properties. In the "lunch" example above, upon detecting that the event includes a category (e.g., "lunch"), the event monitor 144 can be configured to further determine one or more properties that may impact workflow for the event. As such, in the illustrated example, the event monitor 144 can be configured to indicate to the workflow controller 146 that the calendar item 108 involves creation and/or modification of one or more related workflows and pass the identified category and one or more properties to the workflow controller 146 for further processing.

The workflow controller 146 can be configured to generate a new workflow (e.g., "automatic confirmation") or modifying an existing workflow (not shown) including definitions of actions, action parameters, and/or other suitable information. Each workflow can include one or more operations or actions to be performed by one or more computing services (e.g., the calendar service 140, the email service 152, or the presence service 154) hosted on the backend servers 106 or other suitable locations. The new workflow(s) can then be stored in a data storage 150 as individual workflow records 151.

Figure 3C:
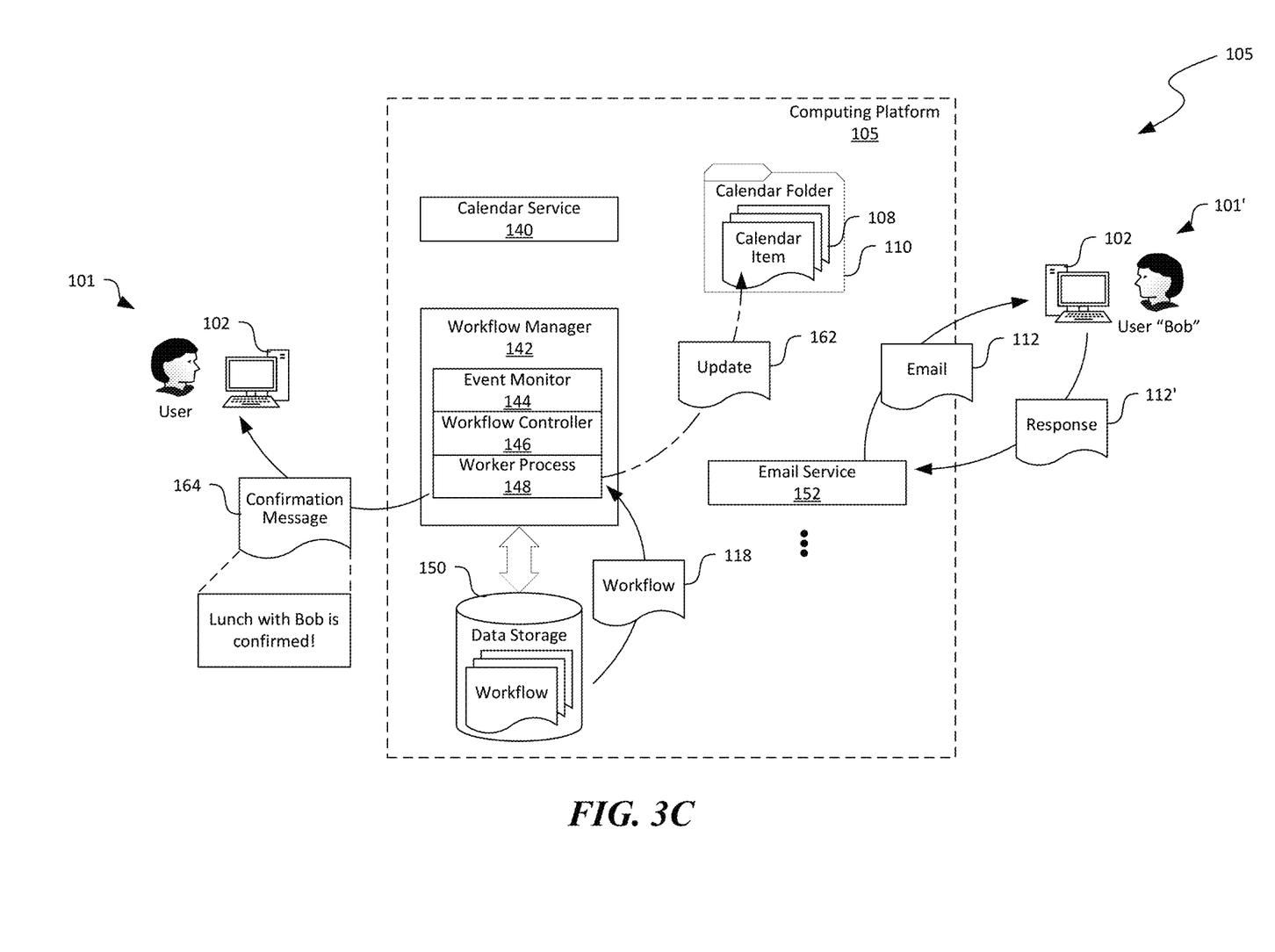
Figure 3D:
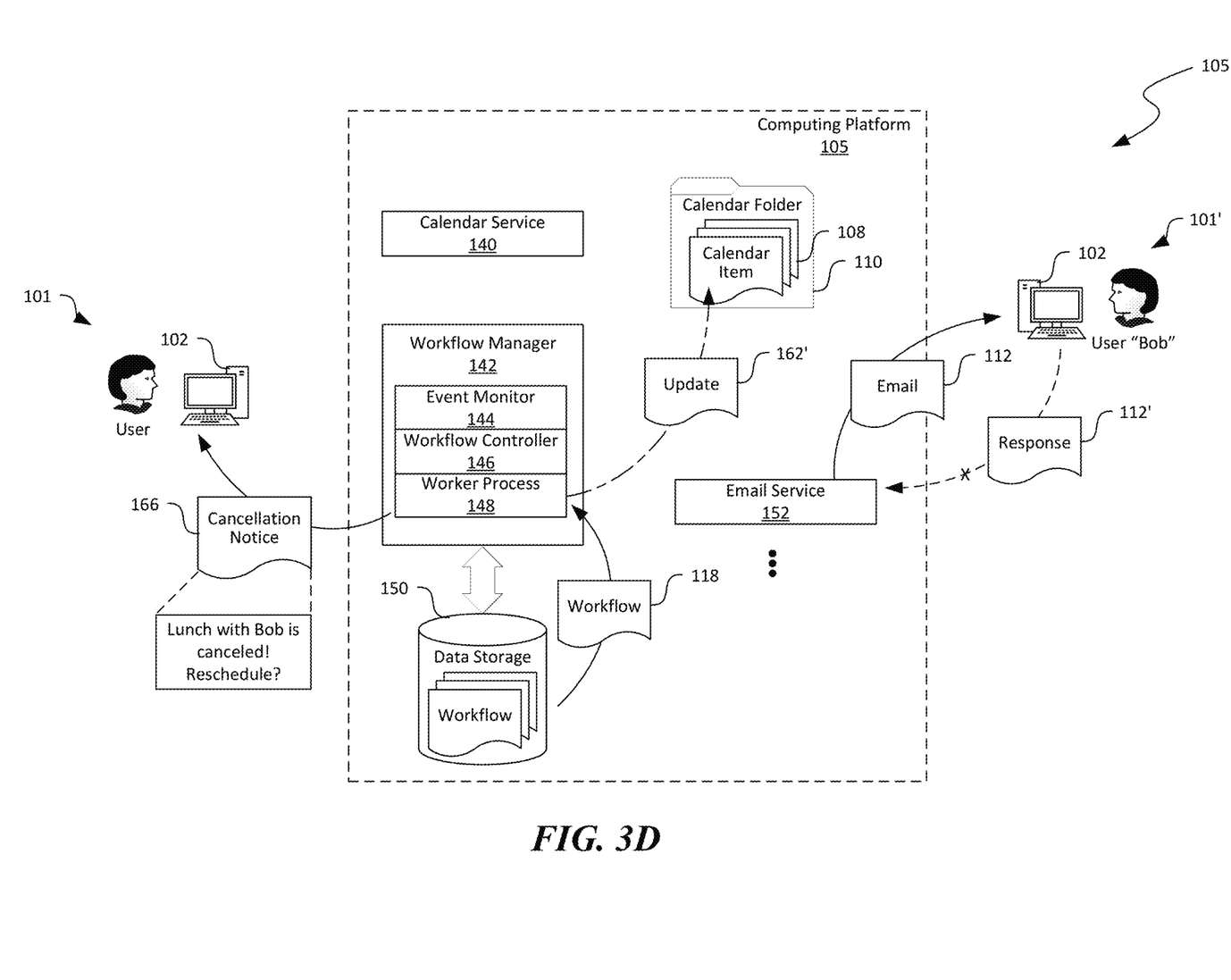

The worker process 148 can be configured to execute the created and/or modified workflow(s) related to the calendar item 108. For instance, in the "lunch" example above, upon determining that a duration prior to a start date/time is reached, the worker process 148 can be configured to generate suitable calls to an APIs of the email service 152 to generate and transmit confirmation emails 112 to other participants of the "lunch" event, e.g., "Bob" 101'. The worker process 148 can also be configured to monitor for responses to the sent confirmation email 112 from the participant. When a response from "Bob" 101' is received, the worker process 148 can be configured to determine whether the response is positive. In response to determine that the response is positive, the worker process 148 can be configured to modify the "lunch" calendar item 108 with an update 162 indicating that the event has been confirmed, transmitting a confirmation message 164 to the user 101 indicating the "lunch" event is confirmed, or perform other suitable actions, as shown in FIG. 3C. On the other hand, when one or more participants, e.g., "Bob" 101' responds negatively or do not respond within a threshold duration (e.g., 1 day), the worker process 148 can be configured to automatically cancel and/or reschedule the event, transmitting a cancelation notice 166 to the user and/or other participants, etc., as shown in FIG. 3D.

As such, by allowing the user 101 to select categories of events that have one or more properties defining corresponding behaviors, the computing platform 105 can provide additional event management capabilities to the user 101 by creating or modifying workflows without compromising privacy/security or violating legal requirements in various regions. Without divulging any details of the calendar item 108, the user 101 can define certain actions or workflows be performed by the backend servers 106 via selecting categories and properties for the categories. As such, the backend servers 106 can be operated efficiently to provide good user experience.

Figure 4A:
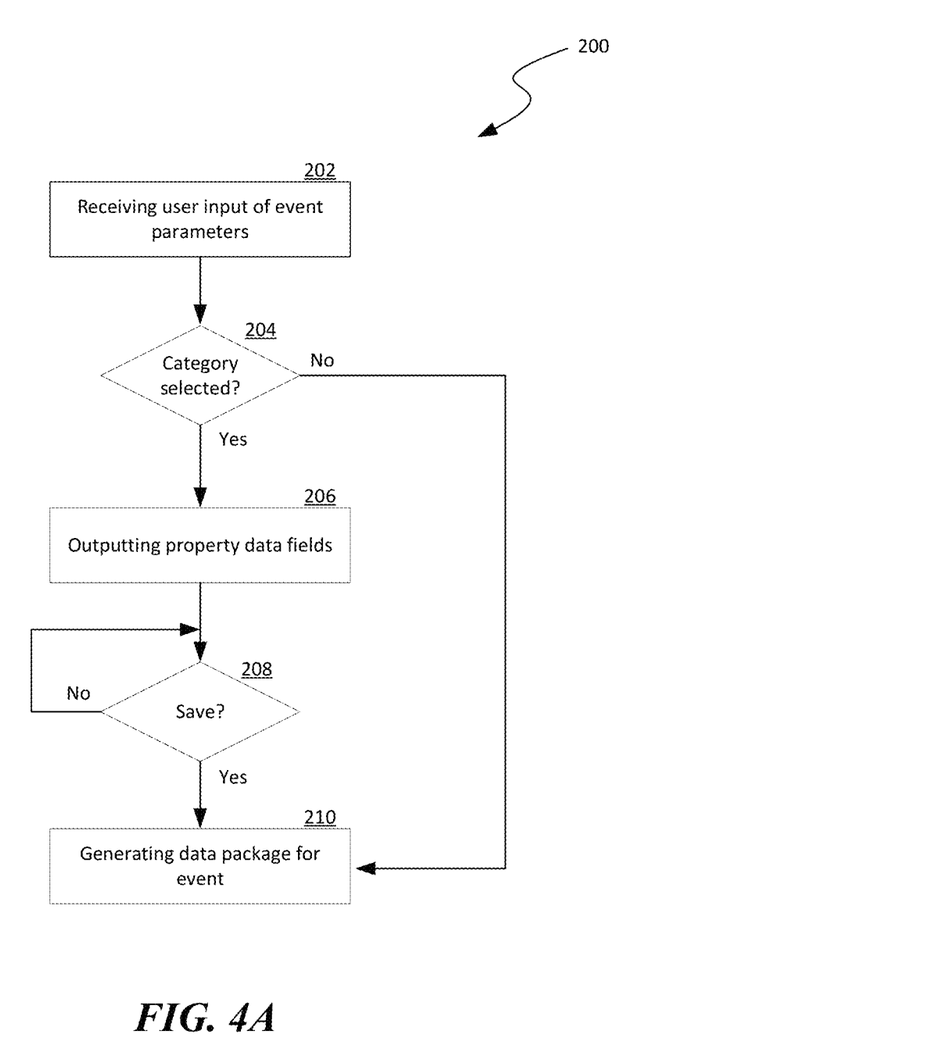
FIGS. 4A and 4B are flow diagrams illustrating aspects of processes for implementing event workflow management in accordance with embodiments of the present technology.
Figure 4B:
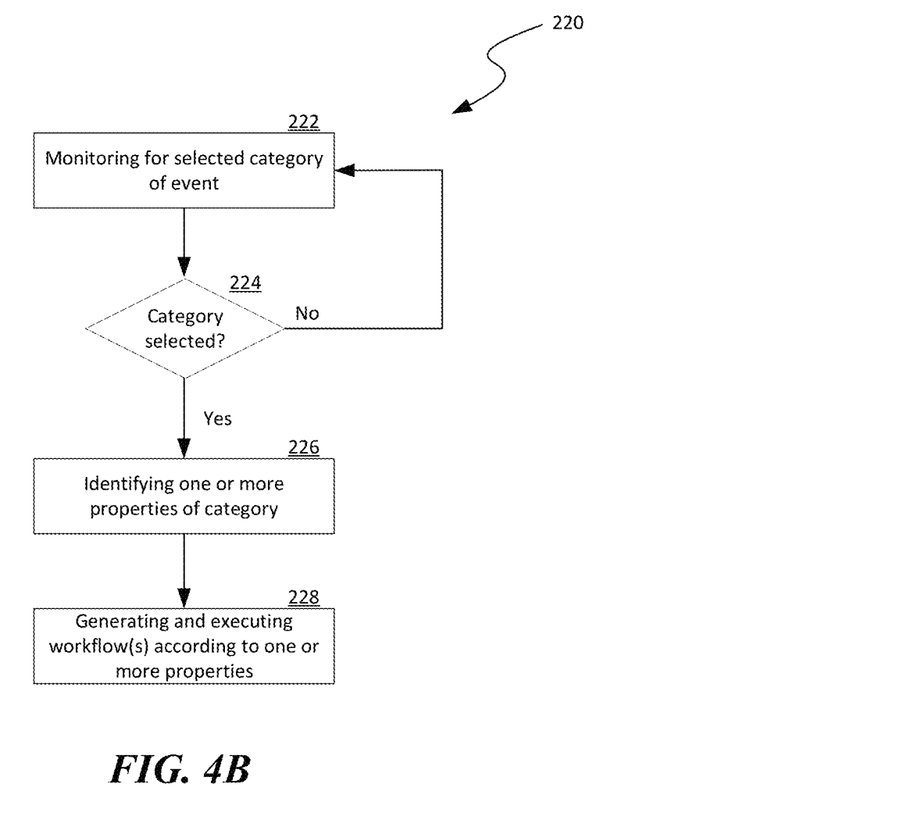

FIGS. 4A and 4B are flow diagrams illustrating aspects of processes for implementing event workflow management in accordance with embodiments of the present technology. Though the processes are described below in the context of the computer system 100 in FIGS. 1-3D, aspects of the processes can also be implemented in computer systems with additional and/or different components.

As shown in FIG. 4A, a process 200 can include receiving user input of event parameters of a calendar item at stage 202. In one embodiment, the user input can be received from a client device via a graphical user interface such as the graphical user interface 129 in FIGS. 2A and 2B outputted to user on a client device 102 (FIG. 1). In other embodiments, the user input can be received as a data package with structured or unstructured data or in other suitable manners. The process 200 can then include a decision stage 204 to determine whether the received user input includes a selected category for the calendar item. In response to determining that a selected category is not detected, the process 200 proceeds to generating a data package for the calendar item based on the received user input of various event parameters at stage 210.

In response to determining that a selected category is detected, the process 200 can proceed to outputting additional property data fields at stage 206. In certain embodiments, the additional data fields can be configured to allow the user to select one or more default properties and input property values of the selected one or more default properties for the selected category. In other embodiments, the additional data fields can also be configured to allow the user to create custom properties and input property values to the custom properties. The process 200 can then include an additional decision stage 208 to determine whether a user indication to save the calendar item is received. In response to determining that a user indication to save the calendar item is received, the process 200 proceeds to generating the data package for the event at stage 210. The data package can include data representing the selected category as well as one or more properties and property values of the category. Otherwise, the process 200 reverts to determining whether a user indication to save the calendar item is received.

As shown in FIG. 4B, a process 220 can include monitoring for a selected category in a data package representing a calendar item such as an event at stage 222. In response to determining that a selected category is not detected, the process 220 reverts to monitoring for a selected category at stage 222. In response to detecting that the calendar item includes a selected category, the process 220 proceed to identifying one or more properties of the selected category at stage 226. In certain implementations, the one or more properties can be parsed from a data package representing the calendar item. In other implementations, the one or more properties can be looked up from a database containing records of categories and associated properties. The process 220 can then include generating and executing one or more workflow(s) corresponding to the one or more properties of the selected category at stage 228. Example operations of generating and executing one or more workflow(s) are described above in more detail with reference to FIGS. 3A-3D.

Figure 5:
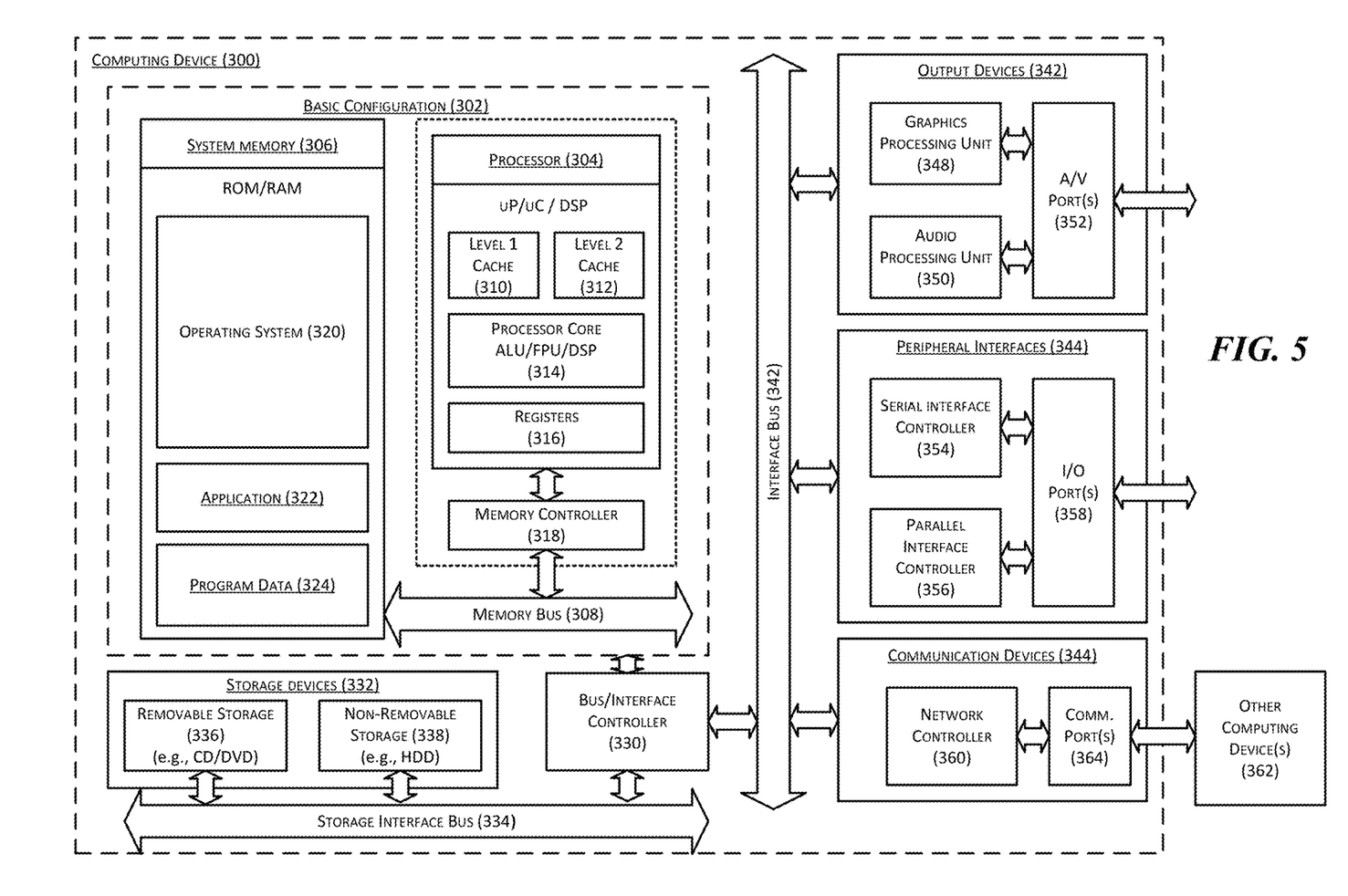
FIG. 5 is a computing device suitable for certain components of the computing system in FIGS. 1-3.

FIG. 5 is a computing device 300 suitable for certain components of the distributed computing system 100 in FIG. 1, for example, the backend servers 106 and the client device 102. In a very basic configuration 302, the computing device 300 can include one or more processors 304 and a system memory 306. A memory bus 308 can be used for communicating between processor 304 and system memory 306. Depending on the desired configuration, the processor 304 can be of any type including but not limited to a microprocessor (µP), a microcontroller (µC), a digital signal processor (DSP), or any combination thereof. The processor 304 can include one more level of caching, such as a level-one cache 310 and a level-two cache 312, a processor core 314, and registers 316. An example processor core 314 can include an arithmetic logic unit (ALU), a floating-point unit (FPU), a digital signal processing core (DSP Core), or any combination thereof. An example memory controller 318 can also be used with processor 304, or in some implementations memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. This described basic configuration 302 is illustrated in FIG. 5 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile as well as removable and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more A/V ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

From the foregoing, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

We claim:

1. A method of implementing event workflow management in a computing system having a client device and a backend server interconnected by a computer network, the method comprising:

receiving, from the client device, a data package defining a calendar event to be stored as a calendar item in an electronic calendar of a user, the data package containing data representing a category corresponding to a type of activity of the calendar event, wherein the category is one of a plurality of categories each having an associated schema that defines at least one workflow property for the particular category, wherein the associated schema of the category defines at least one different or additional user-selectable workflow property compared to other associated schemas of other categories of the plurality of categories;

upon receiving the data package, at the backend server, parsing the data in the data package to identify parsed data including the category of the calendar event, the workflow property of the category according to the schema of the category, and a start date/time of the calendar event;

storing the parsed data;

based on the category of the calendar event and identified workflow property of the category, creating or modifying a backend workflow of the calendar event corresponding to the identified workflow property of the category, the backend workflow including one or more actions to be performed in a sequence by the backend server when one or more status conditions of the calendar event are satisfied, wherein the status conditions are based on the start date/time of the calendar event in the stored parsed data;

subsequently, monitoring for the one or more status conditions that are based on the start date/time of the calendar event and included in the backend workflow;

determining that the one or more status conditions of the calendar event are satisfied; and executing, with the backend server based on the determination that the one or more status conditions of the calendar event are satisfied, the one or more actions in the sequence of the backend workflow in relation to the calendar event.

2. The method of claim 1 wherein the workflow property corresponds to a type of workflow to be performed in relation to the event defined by default or defined by the user via the client device.

3. The method of claim 1 wherein:
the category of the event corresponds to a type of activity of the event;
the workflow property corresponds to a type of action to be performed in relation to the event and includes a property name and a property value; and
creating or modifying the backend workflow corresponding to the event includes creating the backend workflow having the one or more actions in the sequence corresponding to the type of workflow of the workflow property using the property value.

4. The method of claim 1 wherein:
the workflow property corresponds to a type of workflow to be performed in relation to the event and includes a property name and a property value; and
creating or modifying the backend workflow corresponding to the event includes modifying one of the one or more actions in the sequence of the backend workflow based on the property value of the workflow property.

5. The method of claim 1 wherein:
monitoring for the one or more status conditions of the event includes monitoring for whether the start date/time is reached.

6. The method of claim 1 wherein:
monitoring for the one or more status conditions of the event includes determining whether the start date/time is reached; and executing the one or more actions in the sequence of the workflow includes executing the one or more actions in the sequence of the workflow upon determining that the start date/time is reached.

7. The method of claim 1 wherein:
monitoring for the one or more status conditions of the event includes determining whether a threshold period prior to the start date/time is reached; and
executing the one or more actions in the sequence of the workflow includes executing the one or more actions in the sequence of the workflow upon determining that the threshold period prior to the start date/time is reached.

8. The method of claim 1 wherein:
the workflow property includes a property name and a property value;
monitoring for the one or more status conditions of the event includes determining whether the start date/time is reached; and
executing the one or more actions in the sequence of the workflow includes, upon determining that the start date/time is reached, performing one or more of the following according to the property value:
automatically generating and transmitting an email,
automatically declining one or more invitations to the user, or
silencing all notifications of instant messages and/or emails.

9. The method of claim 1 wherein:
the workflow property defines an automatic confirmation and a threshold duration prior to the start date/time of the event; and
monitoring for the one or more status conditions of the event includes determining whether the threshold duration prior to the start date/time is reached; and
executing the one or more actions in the sequence of the workflow includes, upon determining that the threshold duration prior to the start date/time is reached,
automatically generating and transmitting one or more emails to one or more participants of the event; and
based on one or more responses received or a lack of response to the one or more emails, automatically canceling or rescheduling the event.

10. A computing device interconnected to a client device by a computer network, the computing device comprising:
a processor;
a memory operatively coupled to the processor, the memory containing instructions executable by the processor to cause the computing device to:
cause a display of a user-interface, on the client device, displaying multiple fields for defining a calendar event, the fields including a category field and at least one workflow property field based on a category selected in the category field, wherein the workflow property field is associated with a type of workflow to be performed by a backend server in relation to the calendar event, and the category is one of a plurality of categories, each category having at least one different or additional workflow property field compared to other categories of the plurality of categories;
receive, from the client device, a data package defining the calendar event to be stored as a calendar item in an electronic calendar of a user, the data package containing data representing a start date/time of the calendar event and data representing the selected category, the selected category corresponding to a type of activity of the calendar event, wherein each of the plurality of categories has an associated schema that defines at least one workflow property for the particular category;

upon receiving the data package, at a backend server, parse the data in the data package to identify parsed data including the category, selected from the category field, of the event, the workflow property, selected from the workflow property field, of the category according to the schema of the category, and data representing the start date/time of the calendar event;

storing the parsed data;

based on the category of the event and identified workflow property of the category, generate or modify a backend workflow of the event corresponding to the identified workflow property of the category, the backend workflow including one or more actions to be performed in a sequence by the backend server after the parsed data is stored and when one or more status conditions of the event are satisfied, wherein the status conditions are based on the start date/time of the calendar event in the stored parsed data;

monitor for the one or more status conditions that are based on the start date/time of the event and included in the backend workflow; and when the monitoring indicates that the one or more status conditions of the event are satisfied, execute, with the backend server, the one or more actions in the sequence of the backend workflow in relation to the event.

11. The computing device of claim 10 wherein:
to monitor for the one or more status conditions of the event includes to monitor for whether the start date/time is reached.

12. The computing device of claim 10 wherein:
to monitor for the one or more status conditions of the event includes to determine whether the start date/time is reached; and
to execute the one or more actions in the sequence of the workflow includes to execute the one or more actions in the sequence of the workflow upon determining that the start date/time is reached.

13. The computing device of claim 10 wherein:
to monitor for the one or more status conditions of the event includes to determine whether a threshold period prior to the start date/time is reached; and
to execute the one or more actions in the sequence of the workflow includes to execute the one or more actions in the sequence of the workflow upon determining that the threshold period prior to the start date/time is reached.

14. The computing device of claim 10 wherein:
the workflow property includes a property name and a property value;
to monitor for the one or more status conditions of the event includes to determine whether the start date/time is reached; and
to execute the one or more actions in the sequence of the workflow includes, upon determining that the start date/time is reached, perform one or more of the following according to the property value:
automatically generating and transmitting an email, automatically declining one or more invitations to the user, or
silencing all notifications of instant messages and/or emails.

15. The computing device of claim 10 wherein:
the workflow property defines an automatic confirmation and a threshold duration prior to the start date/time of the event; and
to monitor for the one or more status conditions of the event includes to determine whether the threshold duration prior to the start date/time is reached; and
to execute the one or more actions in the sequence of the workflow includes, upon determining that the threshold duration prior to the start date/time is reached, to:
automatically generate and transmit one or more emails to one or more participants of the event; and
based on one or more responses received or a lack of response to the one or more emails, automatically cancel or reschedule the event.

16. A method of implementing event workflow management in a computing system having a client device and a backend server interconnected by a computer network, the method comprising:
upon receiving, from the client device, a data package defining a calendar event to be stored as a calendar item in an electronic calendar of a use, determining that the data package includes data representing a user-selected category corresponding to a type of activity of the event, a user-selected workflow property defined by a schema specific to the user-selected category, wherein the associated schema of the category defines at least one different or additional user-selectable workflow property compared to other associated schemas of other categories of the plurality of categories, and data representing a start date/time of the calendar event;
based on the user-selected category of the event and user-selected workflow property of the category, creating or modifying a backend workflow of the event corresponding to the identified workflow property of the category, the backend workflow including one or more actions to be performed in a sequence by the backend server when one or more status conditions of the event are satisfied, wherein the status conditions are based on the start date/time of the calendar event;
subsequently, monitoring for the one or more status conditions that are based on the start date/time of the event and included in the backend workflow;
determining that the one or more status conditions of the calendar event are satisfied; and
based on the determination that the one or more status conditions of the event are satisfied, executing, with the backend server, the one or more actions in the sequence of the backend workflow in relation to the event.

17. The method of claim 16, further comprising:
upon receiving, from the client device, a second data package defining a second calendar event to be stored as a second calendar item in the electronic calendar of the user, and in response to determining that the second data package does not include data representing a category, maintaining one or more existing backend workflows associated with the second calendar event.

18. The method of claim 16 wherein:
the category of the event corresponds to a type of activity of the event;
the workflow property corresponds to a type of action to be performed in relation to the event and includes a property name and a property value; and
creating or modifying the backend workflow corresponding to the event includes creating the backend workflow having the one or more actions in the sequence corresponding to the type of workflow of the workflow property using the property value.

19. The method of claim 16 wherein:

the workflow property corresponds to a type of workflow to be performed in relation to the event and includes a property name and a property value; and creating or modifying the backend workflow corresponding to the event includes modifying one of the one or more actions in the sequence of the backend workflow based on the property value of the workflow property.

20. The method of claim 16 wherein:

monitoring for the one or more status conditions of the event includes determining whether the start date/time is reached; and executing the one or more actions in the sequence of the workflow includes executing the one or more actions in the sequence of the workflow upon determining that the start date/time is reached.

\* \* \* \* \*